United States Patent
Ringstrom et al.

(10) Patent No.: US 8,654,720 B2
(45) Date of Patent: Feb. 18, 2014

(54) SPECTRUM SHARING ENABLED BY STRONG INTERFERING PULSE HANDLING

(75) Inventors: Markus Ringstrom, Stockholm (SE); Johan Axnas, Solna (SE); Sverker Magnusson, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 551 days.

(21) Appl. No.: 12/741,390

(22) PCT Filed: Apr. 14, 2008

(86) PCT No.: PCT/SE2008/050421
§ 371 (c)(1), (2), (4) Date: May 5, 2010

(87) PCT Pub. No.: WO2009/061253
PCT Pub. Date: May 14, 2009

(65) Prior Publication Data
US 2010/0238894 A1    Sep. 23, 2010

Related U.S. Application Data

(60) Provisional application No. 60/985,756, filed on Nov. 6, 2007.

(51) Int. Cl.
*H04W 4/00* (2009.01)

(52) U.S. Cl.
USPC ........................................... 370/329

(58) Field of Classification Search
USPC .......................................... 370/329, 343, 333
See application file for complete search history.

(56) References Cited

U.S. PATENT DOCUMENTS

| | | | |
|---|---|---|---|
| 7,694,206 B2 * | 4/2010 | Sawada | 714/780 |
| 8,344,936 B2 * | 1/2013 | Stayton | 342/36 |
| 2003/0107512 A1 * | 6/2003 | McFarland et al. | 342/159 |
| 2006/0058035 A1 | 3/2006 | Tsuruno | |

OTHER PUBLICATIONS

Li, T. et al. "Robust Joint Interference Detection and Decoding for OFDM-Based Cognitive Radio Systems with Unknown Interference." IEEE Journal on Selected Areas in Communications, vol. 25, No. 3, Apr. 2007.

* cited by examiner

*Primary Examiner* — Mark Rinehart
*Assistant Examiner* — Mohammad Anwar
(74) *Attorney, Agent, or Firm* — Coats and Bennett, P.L.L.C.

(57) ABSTRACT

Interference between a communication system operating in a frequency area and another system sending out pulses affecting the frequency area can be handled by means of a communication unit (RBS 1. MT1) for use in a cellular communications system, said communications unit comprising detecting means (10, 20) for determining the presence of at least one interfering pulse from another system affecting the signalling in the cellular communications system, and processing means (11, 21) for selecting and taking appropriate action based on the detected at least one interfering pulse.

16 Claims, 4 Drawing Sheets

SPECTRUM SHARING ENABLED BY STRONG INTERFERING PULSE HANDLING

TECHNICAL FIELD

The present invention relates to a communications unit, such as a radio base station or a mobile terminal for use in a cellular communications system. The invention also relates to a method for use in such a system

BACKGROUND AND RELATED ART

One of the scarcest resources in current and future wireless communication systems for providing more capacity and higher data rates is available frequency spectrum. A possible way forward to meet the demands for more spectrum is to use the limited spectrum more efficiently, e.g. through spectrum sharing. This means that different systems are allocated to the same spectrum, the systems possibly being of completely different kinds (e.g. a radar system and a terrestrial mobile communication system). To be able to share spectrum, the interference from the other systems must be managed in a proper way.

In current mobile communication systems, interference from other systems is not dealt with in any particular way. It is handled as thermal noise or intra-system interference, and hence the co-existence with other systems within the same spectrum is virtually impossible. A special case will occur if the interference is of a special character, such as pulsed radar interference. In this case the interference will only affect parts of the information transmitted in the interfered system. Hence, it may be possible for two systems to share the same frequency spectrum, or adjacent frequency spectra, in some cases.

Due to the fact that interference affecting reference symbols, control signaling, synchronization symbols and user data affects the system differently, a strong interfering pulse from e.g. a radar system, though very short in time, might severely impact the performance of the system, by affecting the synchronization symbols, reference symbols and/or control signalling. This is because achieving synchronization is a necessary first step, reference symbols are assumed to be representative for the data and control signalling is used for decoding data.

As a specific example, one may consider a situation where an orthogonal frequency-division multiplexing (OFDM) symbol containing only user data, but no reference symbols (pilots), is affected. It can be shown that with the usual demodulation methods, the affected data symbols will generate soft values that are incorrect, but in spite of that have very large magnitude. This may result in an entire code block being destroyed, even though only a relatively small fraction of the symbols belonging to the code block are affected, and even if strong channel coding is being used. The short interfering pulses may be more or less periodic, or may have no periodicity at all. Since the short radar pulses may in a realistic case appear in the order of once per code block, especially if they are periodic, this may be a severe issue.

SUMMARY OF THE INVENTION

The invention is primarily intended to solve the problem of deploying a cellular, mobile or other type of wireless communication system in a spectrum where there is interference present from another system. The interference may be co-channel interference, adjacent interference or any other type of interference. The other system is considered an interferer to the mobile communication system and is assumed to transmit short radio pulses with sufficiently high energy to disturb the mobile communications system. A pulse is considered to be short if its duration is considerably shorter than the time between two successive pulses. Further, a pulse may be considered short if it is shorter than or comparable in duration to the time over which code blocks are interleaved in the system. A radio pulse with the described characteristics will be referred to as a Strong Interfering Pulse (SIP) for the remainder of this document.

The invention relates to a communication unit for use in a cellular communications system, said communications unit comprising detecting means for determining the presence of at least one interfering pulse from another system affecting the signalling in the cellular communications system, and processing means for selecting and taking appropriate action based on the detected at least one interfering pulse.

The invention further relates to a communication method for use in a cellular communications system, said method comprising the steps of determining, in a communication unit in the communications system. the presence of at least one interfering pulse from another system affecting the signalling in the cellular communications system, selecting and taking appropriate action in the communication unit when the presence of the at least one interfering pulse has been determined.

The detection means may arranged to determine the presence of the at least one interfering pulse by detecting said pulse itself, or based on information received from at least one other communication unit in the first cellular communications system. The information may be acknowledgement or negative acknowledgement (ACK/NACK) signals, or information signifying that the other unit has detected one or more interfering pulses.

The processing means may be arranged to use information about at least two interfering pulses to predict future interfering pulses, on the basis of a periodicity or regularity detected in the timing of the pulses. This information may be used to control the timing of sensitive information.

The processing means may further be arranged to inform at least one other communication unit in the cellular communications system about the at least one interfering pulse.

The appropriate action may be selected based on whether or not a complete symbol has been destroyed. If only part of a symbol has been destroyed, parts of this symbol can be retrieved by setting destroyed samples in the symbol to an expectation value, and increasing the noise estimate for all subcarriers accordingly, before subjecting the symbol to normal receiver processing.

The appropriate action may also be to ignore a block that has been affected by the interfering pulse, or to set the soft value or values associated with any destroyed symbol to a value signifying that the symbol has very little useful information content, for example zero, before decoding the block. In the latter case, the remaining useful information in the block can still be retrieved.

The communication unit may be a radio base station or a mobile terminal.

The invention also relates to a cellular communications system comprising at least a radio base station and a mobile terminal according to the above.

By employing the technique of the invention, more of the scarce resource radio spectrum will be available for mobile communication systems. Examples of spectrum bands that could be available are guard bands of frequency bands where different kinds of radars are operated today.

The techniques described in this document can to a large extent be used to handle interference in an unsynchronized system. e.g. in an unsynchronized TDD system, since in such a case parts of a resource block or a symbol may be heavily interfered, for example, the beginning or the end, but not the rest.

BRIEF DESCRIPTION OF THE DRAWINGS

The invention will be described in more detail in the following, by way of example and with reference to the appended drawings in which.

DETAILED DESCRIPTION OF EMBODIMENTS

Figure 1:
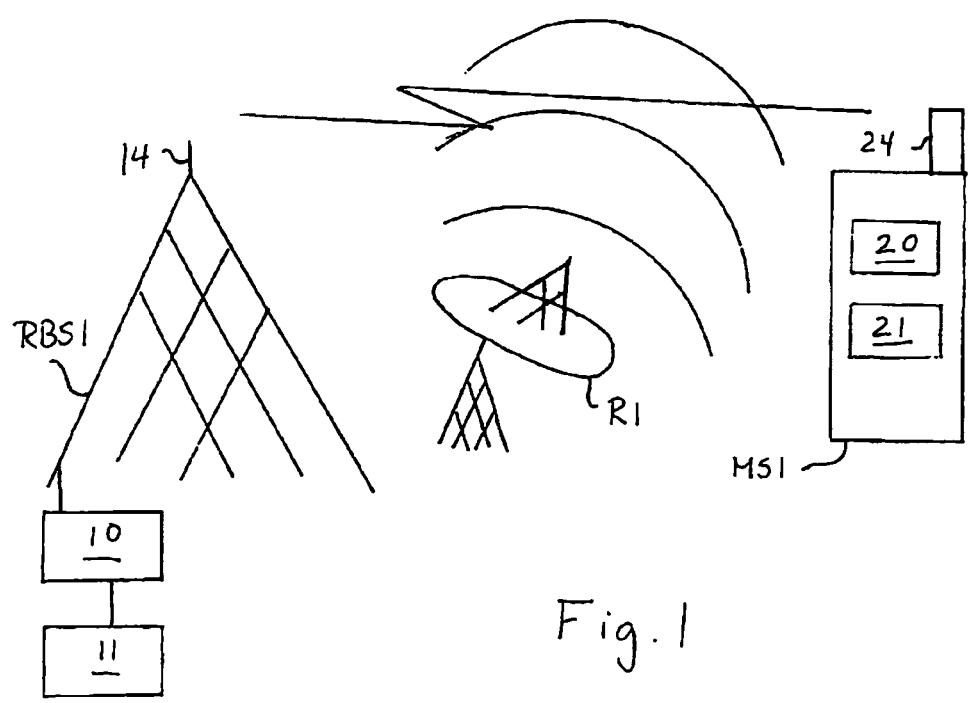
FIG. 1 illustrates, schematically, a situation where two different cellular systems share the same frequency spectrum and therefore interfere with each other.

FIG. 1 shows a simplified view of cellular communications system, represented by a radio base station RBS1 in communication with a mobile terminal MT1. In this example, a radar system R1 operates in a frequency spectrum so that the radar pulses may cause interference in the cellular communications system. It should be understood that the interfering system could be any kind of system sending out pulses in a frequency spectrum that overlaps at least partially, or otherwise affects, the frequency spectrum of the cellular communications system.

According to the invention, at least one of the communicating units of at least one of the communications systems comprises means for detecting interfering signals from the other system and for taking appropriate action. In FIG. 1, the radio base station RBS1 of the first system comprises detection means 10 for detecting the presence of an interfering signal from the other communications system, and processing means 11 for determining and taking appropriate action based on the detection of the interfering signal. Similarly, the mobile terminals MT1 of the first system comprises detection means 20 for detecting the presence of an interfering signal from the other communications system, and processing means 21 for determining and taking appropriate action based on the detection of the interfering signal. Methods for detection, and appropriate actions, will be discussed in the following.

Each of the radio base station and the mobile terminal comprises transmission means, represented in FIG. 1 by antennas 14, 24, respectively, for transmitting the signal.

In one embodiment the invention is based on the following:
1. detecting the presence of a SIP, which may be detected, for example, as a sudden onset, or a short burst, of signal enemy,
2. taking proper actions based on the detected presence of one or more SIPs (e.g. neglect affected data, and/or report the detection of a SIP to the radio base station (RBS) directly or indirectly).

The detection may be performed by the detection means 10, 20 of the radio base station RBS1 and/or the terminal MT1, and the processing means 11, 21 may take proper action in dependence of the detection. The result may be communicated to other terminals and/or base stations, which may also take proper action.

The description is based on downlink signalling. As would be obvious to the skilled person, the mobile terminal could perform the functions described here as performed the radio base station, and vice versa, for example in a situation of uplink signalling.

Figure 2:
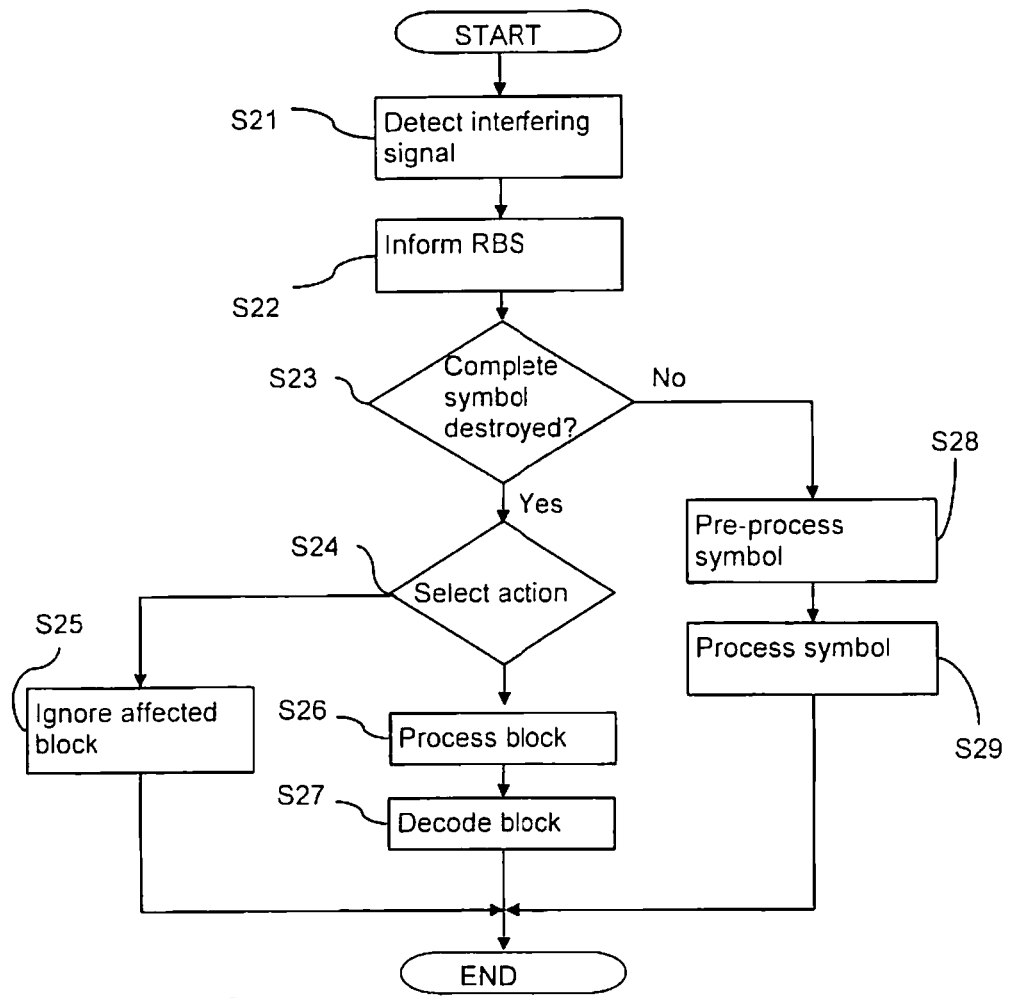
FIG. 2 is a flow chart of the situation where the terminal detects the interfering signal.

FIG. 2 is a flow chart of the situation where the terminal MT1 comprises detection means 20 arranged to detect the interfering pulses. Preferably the detection means is arranged to detect several interfering pulses and determine a periodicity, or other type of regularity, between them.

In a first step S21, the interfering pulse is detected. In a second, optional step. S22 the terminal, for example the processing means 21 in the terminal MT1, sends a dedicated report to the RBS to make the RBS aware of the SIP. The report can contain, for example, information that there exists a SIP and certain characteristics of the SIP, e.g. when the SIP occurred, the signal strength and the duration of the SIP.

In a third step S23, the processing means 21 of the mobile terminal MT1 determines whether or not a complete symbol has been destroyed. If this is the case, the processing means 21, in step S24, selects an appropriate action related to the handling of the data that was transmitted at the same time as the SIP. One alternative, shown in step S25, is to just ignore that block (for example, a code block) or frame of data. In this case, a NACK is preferably sent to the base station. Alternatively, the processing means 21 may try to decode the data. Before doing that, in step S26 some actions should be taken to improve the performance. Destroyed symbols should have their corresponding soft values set to zero. In step S27 an attempt is made to decode the block.

The processing that is preferably performed in step S26 is useful from at least two perspectives. Firstly, it prevents the soft buffer from storing a strong and incorrect value which might be softly combined with retransmissions. Secondly, the impact of the strong and incorrect values on the (turbo) decoder is limited. The above is true for signaling and user data. Should the affected symbol on the other hand be a reference symbol, the symbol should just be ignored (which is different from setting it to zero, since that would render a channel estimate with very high path loss and basically random phase).

If destroyed symbols are set to zero in the decoder, the noise estimate input to the decoder and other parts of the receiver should be adjusted (upwards). Of course, it would be possible to perform the actions described in steps S25, S26 and S27 even if only part of a symbol had been destroyed.

If the symbol is not completely destroyed, it may be possible to recover some of the information in the symbol. This may happen, for example, if the SIP is much shorter than the symbol duration, or if the SIP is not too strong, or if the symbol occurs during the weak "tail" of the SIP due to time dispersion. In such cases, the procedure after step S23 continues with step S28, in which the symbol is pre-processed to allow for a more reliable decoding of the damaged symbol. The nature of this pre-processing depends on the type of interference, as will be discussed in the following.

In step S29 the symbol, preferably processed as discussed in step S28, is subjected to normal receiver processing.

Figure 3:
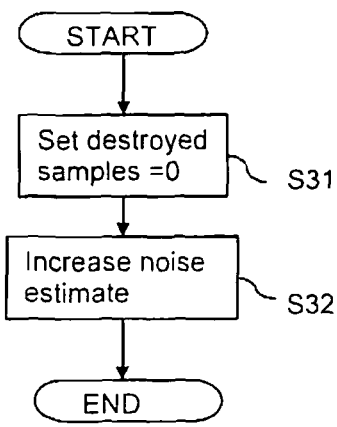
FIG. 3 is a more detailed flow chart of part of FIG. 2.

FIG. 3 is a more detailed view of step S28 in the case where the SIP is very short. In this case, only a fraction of the samples belonging to the symbol may be affected (samples could here refer to, e.g., the samples of an OFDM symbol or to Wideband Code Division Multiple Access (WCDMA) chips). The receiver can then make use of the symbol anyway by setting the destroyed samples to zero (or to the expectation value, if different), as shown in step S31 and increase the noise estimate for all subcarriers accordingly, as shown in step S32. For example, if 10% of the samples are destroyed, a simple method could be to increase the noise estimate by roughly 10% of the average desired signal energy per subcarrier. In the case of multiple receive antennas, the SIP may have a spatial correlation that should preferably be taking into account as a noise correlation.

Figure 4:
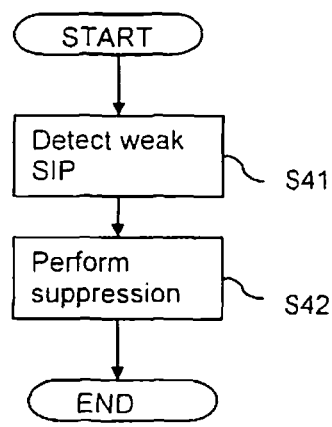
FIG. 4 is a flow chart of the situation where a weak interfering pulse.

In the case where a symbol is only affected by a relatively weak SIP power (weak SIP or a time dispersion tail), the receiver may use methods similar to standard interference rejection techniques to suppress the SIP, for example interference rejection combining (IRC). A flow chart for this procedure is shown in FIG. 4. In step S41 a weak interfering pulse or a weak part of an interfering pulse is detected. In step S42 a suppression technique is applied to suppress the interfering pulse.

Note, however, that since the reference symbols may not be affected by the SIP, the receiver may have to blindly estimate the interference characteristics. In the case when the interference rejection techniques are applied to the relatively weak tail of the SIP due to time dispersion (which may be much longer than the transmitted SIP itself), the blind estimation of the spatial characteristics of the SIP can be facilitated by examining the stronger earlier parts of the SIP, during which the desired signal and all other interferers can be neglected in comparison to the SIP power. If reference symbols are also affected by the SIP, those reference symbols (but no others) may be used to estimate the SIP for better interference suppression. Note also that in contrast to standard interference suppression. SIP interference suppression may preferably be applied only to a subset of the samples belonging to a symbol.

If the communication system uses linear dispersion codes (transmit diversity and/or space-time block codes), a situation similar to the case where only subset of the samples belonging to a symbol are affected may arise: A modulation symbol (e.g. a QAM symbol) may be dispersed over two or more transmission symbols, out of which only subset are affected by the SIP. The techniques described above in connection with step S28 may be used also in this case.

Figure 5:
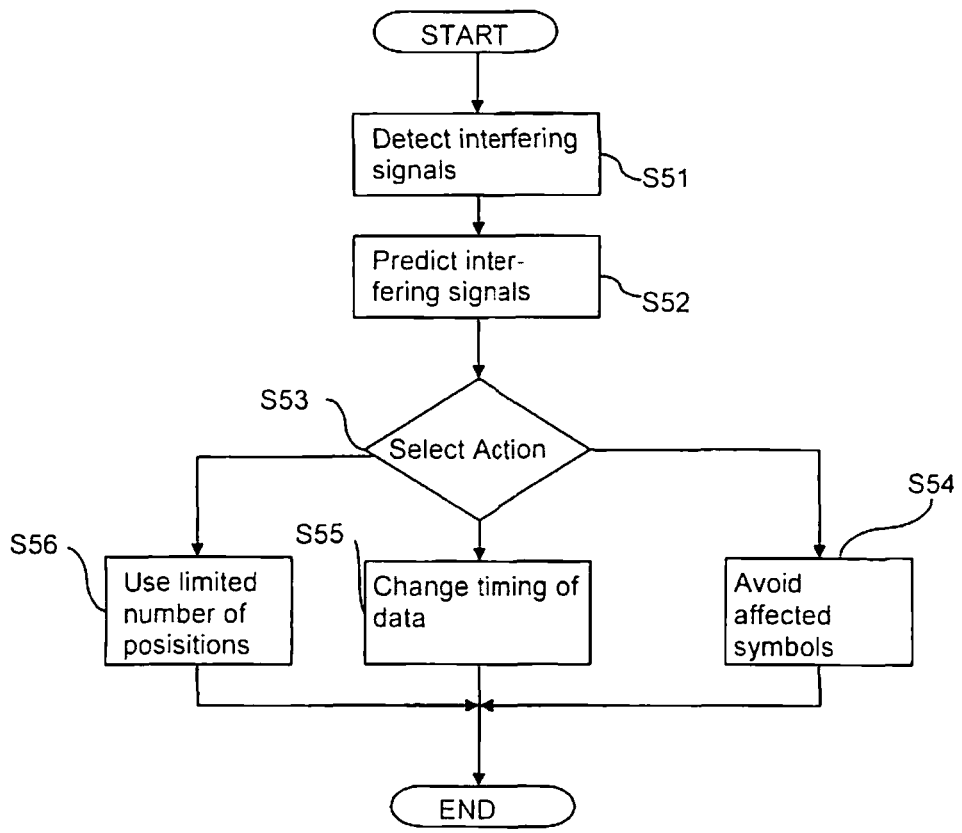
FIG. 5 is a flow chart of the situation where the radio base station detects the interfering signal.

FIG. 5 relate to the situation where the radio base station detects the presence of interfering pulses and future interfering pulses can be predicted on the basis of detected pulses.

In step S51 the base station detects a number of subsequent interfering signals. There are several ways for the RBS to detect the presence of a SIP on the downlink. One way to indirectly detect the SIP is for the RBS to build statistics of ACKs and NACKs from the different users. This works if the SIP is regular and hits e.g. every $N^{th}$ frame.

Another way to detect the SIP at the RBS side is to include a terminal-like part in the RBS (or in the vicinity). The terminal part then decodes data received over the air and compares to the known transmitted data. If the difference is too large, it is probably due to a SIP.

If the interfering pulses are regular or otherwise easy to predict, the base station can use the information about the timing of previous pulses to predict future interfering pulses, in step S52. In this case, action can be taken already at the transmitter side. The processing means 11 can select the appropriate action, in step S53. The simplest action, as shown in step S54, is just to avoid transmitting any kind of data in the affected symbols (e.g. by avoiding the corresponding resource blocks).

Another possible action, shown in step S55, is to change the timing of the data to protect system sensitive data, e.g. synchronization symbols and common control data. This may be performed as a timing advance, or a timing delay, that is, the information may be transmitted earlier or later than it normally would. The timing advance, or timing delay, should be communicated to the terminals. If it is not, blind detection could be used. Using a timing advance is advantageous in systems that already have functionality for providing timing advances, since in that case, the existing timing advance functionality may possibly be used in the method according to the invention.

An alternative, shown in step S56, would be to transmit system sensitive data on one (or a few) of a limited number of alternative positions in order to avoid positions that are affected by the SIP. This limits the alternatives for terminal to search in.

If there is a probability that a symbol is affected by a SIP, the RBS can also choose to protect the data transmitted in that symbol by increasing the coding protection and interleave the data over more symbols.

To reduce terminal complexity, the SIP detection can be left to the RBS solely. If a SIP is detected, this is reported to the terminal which then knows that energy received in a SIP affected symbol should not be softly combined with retransmissions. This assumes a robust system design so that a SIP does not cause too much impact on the performance of the system by e.g. always affecting the synchronization symbols.

On the uplink, if macro diversity is being used, the SIP may affect different samples/symbols of the desired signal at the different sites involved because of different traveling distances (for example if the terminal is located at the cell border and has approximately equal distance to both base stations, whereas the SIP generator is located much closer to one of the base stations). This may be utilized by the base station to receive all samples/symbols at least at one site without the influence of the SIP. A system with relays and/or repeaters would also represent a sort of macro diversity, and similar techniques could be used.

The invention claimed is:

1. A communication unit for use in a cellular communications system, said communications unit comprising: a detecting circuit configured for determining the presence of at least one interfering pulse from another system affecting signaling in the cellular communications system, and a processor configured to:
   determine whether or not a complete symbol has been destroyed by the at least one interfering pulse;
   if the complete symbol has been destroyed, either discard data affected by the at least one interfering pulse or set soft values corresponding to the destroyed symbol to zero; and
   if only a part of the symbol is destroyed, recover data affected by the at least one interfering pulse.

2. A communication unit according to claim 1, wherein the detection circuit is configured to determine the presence of the at least one interfering pulse based on information received from at least one other communication unit in the first cellular communications system.

3. A communication unit according to claim 1, wherein the processor is configured to use information about at least two interfering pulses to predict future interfering pulses.

4. A communication unit according to claim 1, wherein the processor is configured to inform at least one other communication unit in the cellular communications system about the at least one interfering pulse.

5. A communication unit according to claim 1, wherein the processor is configured to, if only part of a symbol has been destroyed, set destroyed samples to an expectation value, and increase the noise estimate for all subcarriers accordingly, before subjecting the symbol to normal receiver processing.

6. A communication unit according to claim 1, wherein the processor is configured to ignore a block that has been affected by the interfering pulse.

7. A communication unit according to claim 1, wherein the processor is configured to set the soft value or values associated with any destroyed symbol to a value signifying that the symbol has very little useful information content, before decoding the block.

8. A communication unit according to claim 1, wherein said communication unit is a radio base station.

9. A communication unit according to claim 1, wherein said communication unit is a mobile terminal.

10. A communication method for use in a cellular communications system, said method comprising the steps of:
- determining, in a communication unit in the communications system, the presence of at least one interfering pulse from another system affecting the signaling in the cellular communications system;
- determining whether or not a complete symbol has been destroyed by the at least one interfering pulse;
- if the complete symbol has been destroyed, either discarding data affected by the at least one interfering pulse or setting soft values corresponding to the destroyed symbol to zero; and
- if only a part of the symbol has been destroyed, recovering data affected by the at least one interfering pulse.

11. A method according to claim 10, wherein the presence of the at least one interfering pulse is determined based on information received from at least one other communication unit in the cellular communications system.

12. A method according to claim 10, further comprising the step of using information about at least two interfering pulses to predict future interfering pulses.

13. A method according to claim 10, comprising the step of informing at least one other communication unit in the cellular communications system about the at least one interfering pulse.

14. A method according to claim 10, comprising the step of, if only part of a symbol has been destroyed, setting destroyed samples to an expectation value, and increasing the noise estimate for all subcarriers accordingly, before subjecting the symbol to normal receiver processing.

15. A method according to claim 10, wherein the processor is configured to ignore a block that has been affected by the interfering pulse.

16. A method according to claim 10, comprising the step of setting the soft value of any destroyed symbol to zero before decoding the block.

* * * * *

UNITED STATES PATENT AND TRADEMARK OFFICE
CERTIFICATE OF CORRECTION

PATENT NO. : 8,654,720 B2  
APPLICATION NO. : 12/741390  
DATED : February 18, 2014  
INVENTOR(S) : Ringström et al.

Page 1 of 1

It is certified that error appears in the above-identified patent and that said Letters Patent is hereby corrected as shown below:

On the Title Page, in item (12), under "United States Patent", in Column 1, Line 1, delete "Ringstrom et al." and insert -- Ringström et al. --, therefor.

On the Title Page, in item (75), under "Inventors", in Column 1, Line 1, delete "Ringstrom," and insert -- Ringström, --, therefor.

On the Title Page, in item (75), under "Inventors", in Column 1, Line 2, delete "Axnas," and insert -- Axnäs, --, therefor.

In the Drawings:

In Fig. 5, Sheet 4 of 4, for Tag "S56", in Line 3, delete "posisitions" and insert -- positions --, therefor.

In the Specification:

In Column 3, Line 60, delete "enemy," and insert -- energy, --, therefor.

In Column 4, Line 15, delete "step." and insert -- step, --, therefor.

In Column 5, Line 32, delete "suppression." and insert -- suppression, --, therefor.

Signed and Sealed this  
Twenty-second Day of July, 2014

Michelle K. Lee  
*Deputy Director of the United States Patent and Trademark Office*